United States Patent
Pasadyn et al.

(10) Patent No.: US 6,725,121 B1
(45) Date of Patent: Apr. 20, 2004

(54) METHOD AND APPARATUS FOR USING A DYNAMIC CONTROL MODEL TO COMPENSATE FOR A PROCESS INTERRUPT

(75) Inventors: Alexander J. Pasadyn, Austin, TX (US); Anthony J. Toprac, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 329 days.

(21) Appl. No.: 09/864,692

(22) Filed: May 24, 2001

(51) Int. Cl.[7] ............................................... G06F 19/00
(52) U.S. Cl. ......................... 700/121; 700/29; 700/31
(58) Field of Search ........................... 700/160, 29, 95, 700/121, 31, 44, 123; 216/59, 84; 438/11, 18

(56) References Cited

U.S. PATENT DOCUMENTS 5,933,345 A * 8/1999 Martin et al. ................ 700/44
6,298,470 B1 * 10/2001 Breiner et al. ................ 716/4

* cited by examiner

*Primary Examiner*—Leo Picard
*Assistant Examiner*—Carlos R. Ortiz
(74) *Attorney, Agent, or Firm*—Williams, Morgan & Amerson, P.C.

(57) ABSTRACT

A method for processing an interrupted workpiece includes providing a dynamic control model defining the processing characteristics of a processing tool throughout a processing run; providing a partially processed workpiece; determining an extent of processing metric for the partially processed workpiece; and determining at least one operating recipe parameter of the processing tool based on the dynamic control model and the extent of processing metric. A manufacturing system includes a processing tool and a process controller. The processing tool is adapted to process a partially processed workpiece in accordance with an operating recipe. The process controller is adapted to determine an extent of processing metric for the partially processed workpiece and determine at least one parameter of the operating recipe based on a dynamic control model defining the processing characteristics of the processing tool throughout a processing run and the extent of processing metric.

31 Claims, 4 Drawing Sheets

METHOD AND APPARATUS FOR USING A DYNAMIC CONTROL MODEL TO COMPENSATE FOR A PROCESS INTERRUPT

BACKGROUND OF THE INVENTION

1. Field of the Invention

This invention relates generally to the field of semiconductor device manufacturing and, more particularly, to a method and apparatus for using a dynamic control model to compensate for a process interrupt.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Typically, the control models used to generate the operating recipe parameters for the tool are "steady-state" models. For example, models used to control a polish or etch process control the processing time assume that the average rate is constant throughout the processing run. In the actual processing run of the tool, the processing rate is not actually constant. A typical processing run may include different segments, such as a warm-up segment and one or more main segments. The actual processing rate may vary between each of these segments and even within each segment.

The processing rate changes during the course of the processing run for a variety of reasons. For a polish process, the rate is dependent on the topography of the wafer surface. As the wafer is planarized, the rate approaches the "bare-wafer" removal rate. In addition, multiple polishing recipe segments may have different polishing rates themselves. For example, a commonly used polishing technique for polishing a copper layer to form interconnect structures uses two stages. The first polishing stage (i.e., platen 1) removes the copper at a relatively high rate. The first stage removes most of the copper extending beyond interconnect trenches formed in an interlayer dielectric (ILD) layer. The second polishing stage (i.e., platen 2) removes the copper at a much slower rate until an endpoint signal is received. A typical endpoint signal may be generated optically based on the optical property differences between the copper and an underlying barrier layer. After an endpoint signal is received, the polishing continues for a fixed amount of time (i.e., overpolish time) to help ensure that all of the copper is removed. Variations in the incoming thickness of the copper layer can introduce processing variations in the tool that can cause excessive dishing of the copper or erosion of the barrier layer and ILD layer. For example, if the incoming copper thickness is sufficiently small, all of the copper may be removed during the platen 1 polish. Subsequent platen 2 polishing will cause high degrees of dishing or erosion. If the incoming copper thickness is sufficiently high, a large amount of copper will still remain after the platen 1 polish, resulting in an extremely long platen 2 polish time.

One possible control technique for controlling the polishing tool is to control the platen 1 polish time based on incoming copper thickness to try to provide a constant remaining copper thickness for the platen 2 polish. Controlling the tool in this manner will result in an endpoint time for the platen 2 polish that is reasonably stable. Such a control technique assumes a steady state material removal rate for determining the operating recipe parameter for the platen 1 polishing time.

An etch process may also include similar processing rate variations within the etching segments. During an etch process, material can build up inside the chamber, reducing the etch rate. Also, changes in the power settings and reactant gas concentrations that are used throughout the run may cause variations in the etch rate. An exemplary control technique may involve controlling the etch time for one or more segments of the processing run based on the incoming thickness of a process layer to be etched to reduce the amount of overetch. Overetching has the potential to change the critical dimensions of the features being etched or to damage surrounding features and degrade the performance of the semiconductor device. In controlling the etch time to minimize overetch time, an average etch rate of the etch tool may be used to predict an etch time based on the incoming process layer thickness.

Steady state control techniques assume a constant or average processing rate and control the processing time in one of the segments of the processing run to achieve an end product characteristic that is presumably closer to a target value. Under normal circumstances, this steady state approach is acceptable. Controlling the operating recipe parameters based on the average processing rate factors in the processing rate variations in the multiple segments.

However, some processing runs are interrupted for various reasons, such as tool problems, including loss of power, operator abort, or loss of gas pressure, etc. Sometimes the error that caused the interruption of the processing run also causes a change in the assumed processing rate of the tool. For example, if the plasma power in an etch tool is higher than expected, the tool may be shut down. The increased plasma power may have resulted in a higher than expected etch rate for the tool. In such cases where the processing run is interrupted, a steady state model cannot be employed to generate operating recipe parameters for completing the processing of the wafer upon recommencement of the processing run. The steady state model factors in the processing rate variations inherent in the processing run and generates a total processing time. The predicted processing time is only valid for wafers subjected to a complete processing run. Because a wafer being processed after an interruption is not subjected to a complete processing run, the steady state condition is not present, and the steady state control model may not be used to control the operating recipe parameters of the tool.

The present invention is directed to overcoming, or at least reducing the effects of, one or more of the problems set forth above.

SUMMARY OF THE INVENTION

One aspect of the present invention is seen in a method for processing an interrupted workpiece. The method includes providing a dynamic control model defining the processing characteristics of a processing tool throughout a processing run; providing a partially processed workpiece; determining an extent of processing metric for the partially processed workpiece; and determining at least one operating recipe parameter of the processing tool based on the dynamic control model and the extent of processing metric.

Another aspect of the present invention is seen in a manufacturing system including a processing tool and a process controller. The processing tool is adapted to process a partially processed workpiece in accordance with an operating recipe. The process controller is adapted to determine an extent of processing metric for the partially processed workpiece and determine at least one parameter of the operating recipe based on a dynamic control model defining the processing characteristics of the processing tool throughout a processing run and the extent of processing metric.

BRIEF DESCRIPTION OF THE DRAWINGS

The invention may be understood by reference to the following description taken in conjunction with the accompanying drawings, in which like reference numerals identify like elements, and in which.

Figure 1:
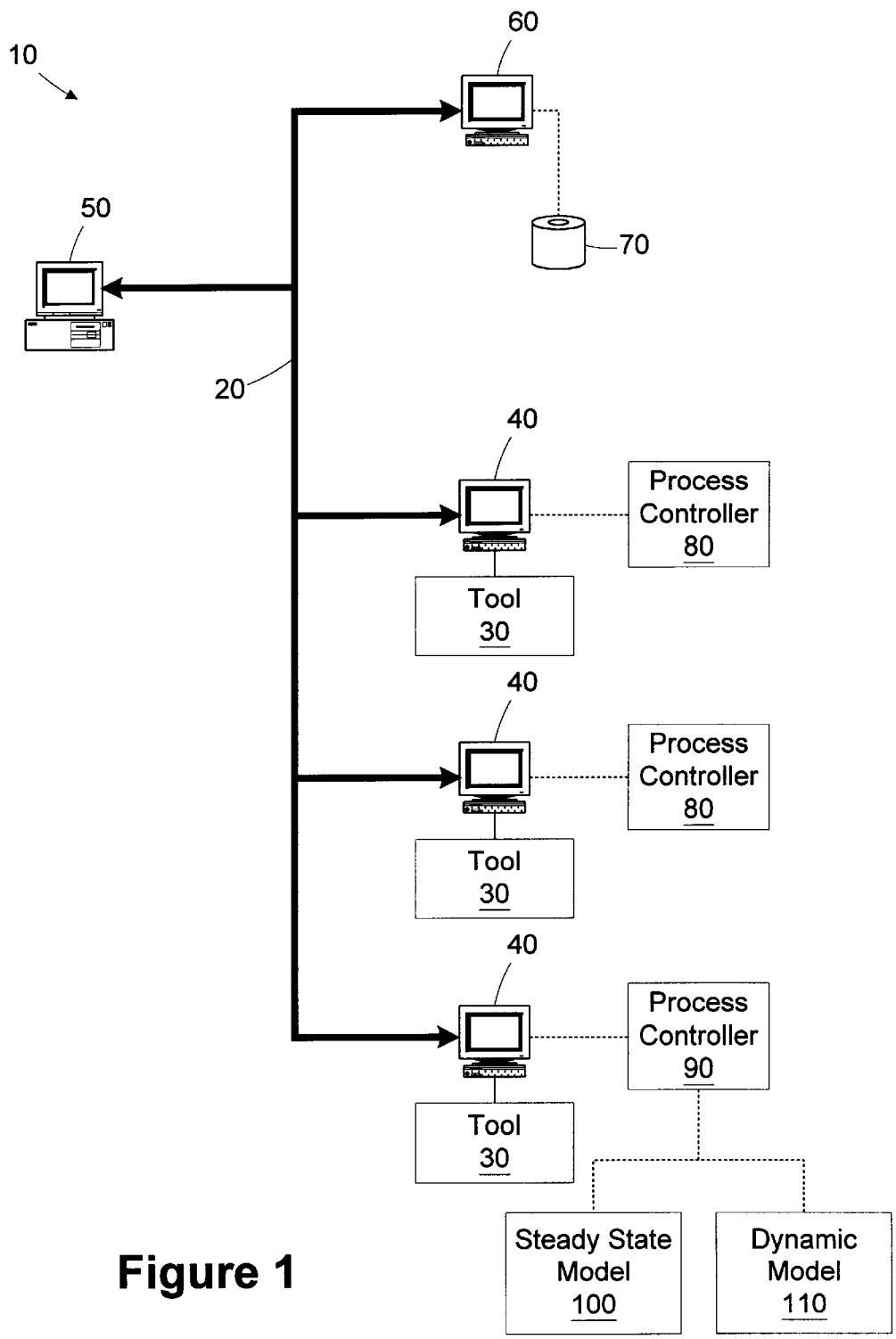
FIG. 1 is a simplified block diagram of an illustrative manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system is adapted to process semiconductor wafers, however, the invention is not so limited and may be applied to other types of manufacturing environments and other types of workpieces. A network 20 interconnects various components of the manufacturing system, allowing them to exchange information. The illustrative manufacturing system 10 includes a plurality of tools 30, each being coupled to a computer 40 for interfacing with the network 20. A process control server 50 directs the high level operation of the manufacturing system 10 by directing the process flow of the manufacturing system 10. The process control server 50 monitors the status of the various entities in the manufacturing system, including the tools 30. The tools may be processing tools, such as photolithography steppers, etch tools, deposition tools, polishing. tools, rapid thermal processing tools, implantation tools, etc., or metrology tools for measuring characteristics of the wafers being processed in the manufacturing system 10. A database server 60 is provided for storing data related to the status of the various entities and workpieces (e.g., wafers) in the process flow. The database server 60 may store information in one or more data stores 70. The data may include pre-process and post-process metrology data, tool states, process flow activities (e.g., scheduled maintenance events, processing routes for lots of wafers), etc. The distribution of the processing and data storage functions amongst the different computers 40, 50, 60 is generally conducted to provide independence and a central information store. Of course, more or less computers may be used.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some of the tools 30 may include process controllers 80, 90 that are adapted to automatically control the operating recipes of their respective tools 30. A particular tool 30 may have more than one process controller 80, 90 adapted to control more than one operating recipe parameter. For example, if the tool 30 is a CMP tool, the process controller 80, 90 may receive pre-polish thickness measurements (e.g., thickness of high features, thickness of low features) and predict a polishing time required to achieve a post-polish target thickness. In the case where the tool 30 is an etch tool, the process controller 80, 90 may model the etching performance of the tool 30 based on pre-etch and/or post-etch thickness measurements. The process controller 80, 90 may use a control model of the tool 30 to generate its prediction. The control model may be developed empirically using commonly known linear or non-linear techniques. The control model may be a relatively simple equation based model (e.g., linear, exponential, weighted average, etc.) or a more complex model, such as a neural network model, principal component analysis (PCA) model, or a projection to latent structures (PLS) model. The specific implementation of the model may vary depending on the modeling technique selected. Using the control model, the process controller 80, 90 may determine operating recipe parameters such as etch time, plasma power, temperature, pressure, reactant gas concentrations, etc. to reduce post-etch thickness variations. Other control scenarios are possible with other types of processing tools 30.

The process controller 90 is adapted to use a steady state model 100 for normal processing runs (i.e., complete runs) and a dynamic model 110 for completing processing runs that have been previously interrupted. Based on an indicator associated with an identification code assigned to the wafer being processed in the tool 30, the process controller 90 determines what type of processing the wafer requires (i.e., full run or interrupted run) and selects the appropriate model 100, 110.

The dynamic model 110 models the performance of the tool 30 throughout the entire processing run. For example, the polishing rate of a CMP tool or the etch rate of an etch tool may be modeled for each of the recipe segments and within each recipe segment. In one illustrated embodiment, the processing rate may be modeled as a function of time for each segment. The process controller 90 determines the extent of processing completed on the partially processed wafer and determines operating recipe parameters for the tool 30 to complete the processing.

The process controller 90 may determine the extent of processing in various ways. In one embodiment, the process controller 90 may use the elapsed time that the wafer was processed prior to being interrupted in conjunction with the dynamic model 110 to predict the extent of processing. For example, if the tool 30 is a CMP tool, the process controller 90 may predict the remaining thickness of the process layer being polished based on the amount of time the process layer was polished prior to being interrupted. Similarly, if the tool 30 is an etch tool, the process controller 90 may predict the thickness of the process layer being etched, or the depth of a trench feature being etched.

In another embodiment, the process controller 90 determines the extent of processing based on metrology information collected after the processing interruption. Determining the extent of processing based on metrology information is advantageous in cases where the condition that caused the processing interrupt also affected the processing rate of the tool 30.

A time-based estimate of extent of processing would be less accurate than a metrology-based estimate.

Various measurement techniques are available for collecting metrology data from which to determine the extent of processing. For example, a thickness measuring tool, such as an Optiprobe tool offered by Therma-Wave, Inc. of Fremont, Calif. may be used. Another technique for determining extent of processing involves the use of a scatterometry tool to determine the planarity of a process layer being polished or the step height of a feature being etched, for example. An exemplary scatterometry technique for determining planarity is described in U.S. patent application Ser. No. 09/843,001, entitled "METHOD AND APPARATUS FOR MEASURING PLANARITY OF A POLISHED LAYER," filed in the names of James Broc Stirton and Kevin R. Lensing, and incorporated herein by reference in its entirety. An exemplary scatterometry technique for determining step height is described in U.S. patent application Ser. No. 09/838,498, entitled "METHOD AND APPARATUS FOR DETERMINING STEP HEIGHT USING SCATTEROMETRY MEASUREMENTS," filed in the name of Marilyn I. Wright, and incorporated herein by reference in its entirety.

After determining the extent of processing, the process controller 90 employs the dynamic model 110 to predict operating recipe parameters for the tool 30 to complete the processing. For example, if the operating recipe includes two segments, the extent of processing measurement allows the process controller 90 to determine the particular segment on which the processing was interrupted and what subsequent processing is required to complete processing of the partially processed wafer. In some embodiments, the first segment may be a warm-up or conditioning segment, where the processing chamber is prepared for the second segment, which is the main segment. Even if the processing of the wafer was interrupted during the second segment, the first segment may have to be repeated to place the tool 30 in a desired operating state (e.g., steady temperature, pressure, reactive gas chemistry, etc.). The dynamic model 110 factors in the processing rate during the conditioning stage in determining operating recipe settings for the second stage to complete the processing.

The following example illustrates the operation of the process controller 90 as it may be implemented to control a CMP tool. However, the application of the present invention is not so limited, as it may be applied to other types of processing tools and workpieces other than semiconductor wafers.

Figure 2A:
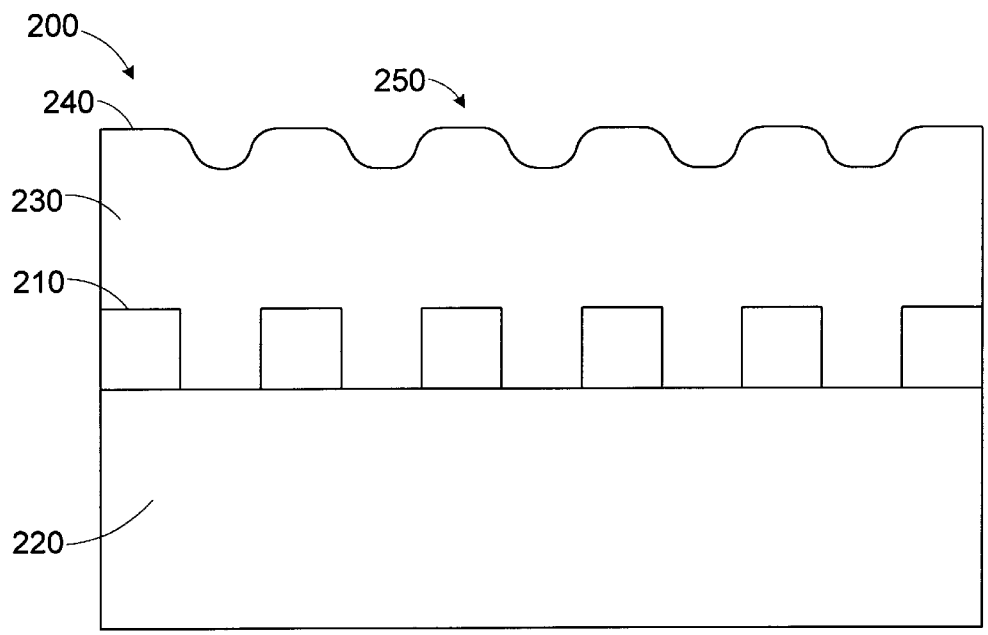
FIGS. 2A, 2B, and 2C are cross section views of an exemplary semiconductor device subjected to a polishing process.

FIG. 2A illustrates a cross-section of an exemplary semiconductor device 200 that is to be subjected to a planarization process. The semiconductor device 200 includes a plurality of transistor gate electrode stacks 210 formed on a substrate 220. For clarity and ease of illustration, not all features of the transistors (e.g., source/drain regions, isolation structures, etc.) are shown. An inter-layer dielectric (ILD) layer 230 is formed over the transistor gate electrode stacks 210. Typically, the ILD layer 230 is a layer of silicon dioxide formed using tetraethoxysilane (TEOS) or fluorine doped tetraethoxysilane (F-TEOS). The ILD layer 230 is polished to planarize a surface 240 of the ILD layer 230. In configuring the tool 30 to polish the ILD layer 230, the process controller 90 employs the steady state model 100 to predict operating recipe parameters, such polish time, down force, slurry composition, etc., for the tool 30. The process controller 90 uses the steady state model 100 because it anticipates that the tool 30 will perform a complete processing run to planarize the ILD layer 230. For some reason (e.g., a gas flow was interrupted, forcing the tool to stop), the polishing of the ILD layer 230 is interrupted.

Figure 2B:
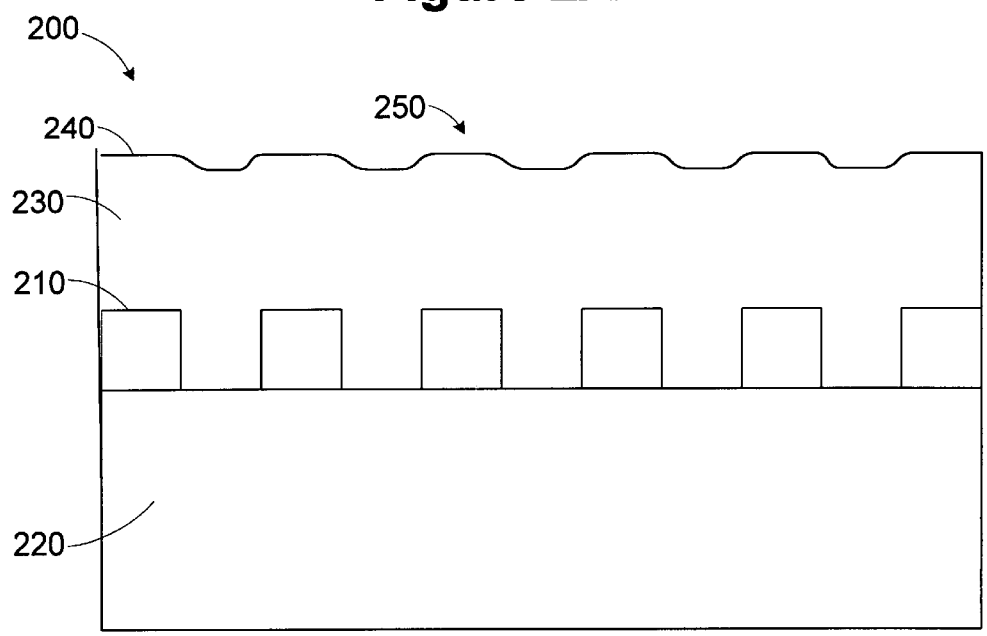

FIG. 2B represents the device 200 of FIG. 2A after the polishing process has been interrupted. Hence, the surface 240 of the ILD layer 230 is not entirely planarized. The process controller 90 then employs the dynamic model 110 to generate operating recipe parameters (e.g., polishing time, down force, slurry composition, etc.) to complete the planarization process. The process controller 90 determines an extent of processing metric for the partially processed wafer either based on the time the ILD layer 230 was polished prior to the interruption and/or based on metrology data (e.g., thickness or planarity) collected for the partially processed wafer. Because the dynamic model 110 incorporates the processing rate of the tool 30 throughout the processing run, the process controller 90 may calculate the polishing time required to complete the planarization (i.e., assuming the other operating recipe parameters remain unchanged). Alternatively, the process controller 90 may hold the polishing time constant and vary a different operating recipe parameter, such as slurry chemistry or down force to change the processing rate of the tool 30 to achieve a similar result.

Typically, the polishing rate of a CMP process varies with the surface planarity of the ILD layer 230. As the raised features 250 are worn away, the polishing rate decreases and approaches the bare-wafer removal rate. Accordingly, the dynamic model 110 determines the processing rate of the tool based on the extent of processing metric (i.e., the expected surface planarity of the ILD layer 230).

Figure 2C:
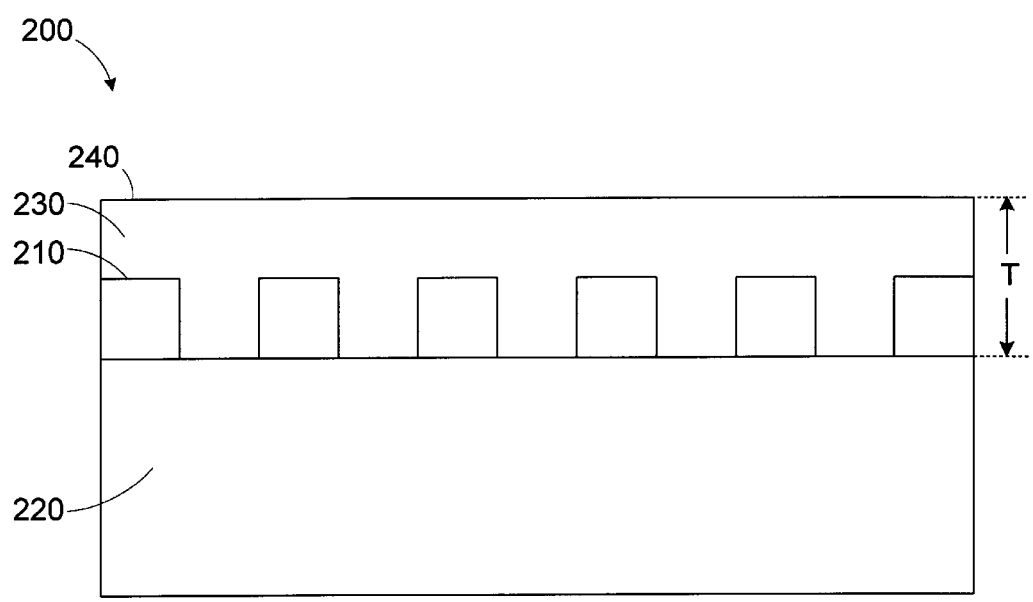

FIG. 2C illustrates the device 200 after the polishing operation is completed based on the operating recipe parameters determined by the process controller 90 based on the dynamic model 110. The process controller 90 determines the operating recipe parameters such that the post-polish thickness, T, of the ILD layer 230 is near a target post-polish thickness value. Additional post-polish metrology data (e.g., thickness or scatterometry) may be collected to provide feedback to the process controller 90 for updating the dynamic model 110.

Figure 3:
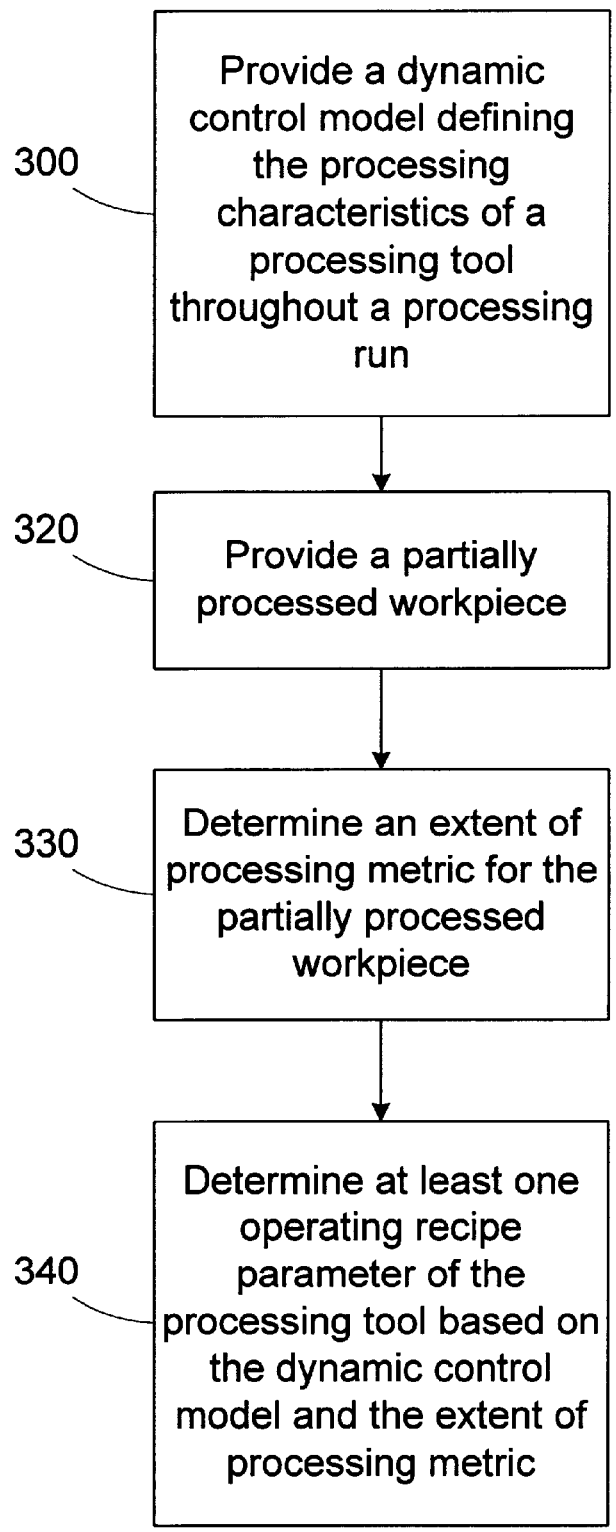
FIG. 3 is a simplified flow diagram of a method for processing an interrupted workpiece in accordance with another illustrative embodiment of the present invention.

Turning now to FIG. 3, is a simplified flow diagram of a method for processing an interrupted workpiece in accordance with another illustrative embodiment of the present invention is provided. In block 300, a dynamic control model defining the processing characteristics of a processing tool throughout a processing run is provided. In block 310, a partially processed workpiece is provided. In block 320, an extent of processing metric is determined for the partially processed workpiece. In block 330, at least one operating recipe parameter of the processing tool is determined based on the dynamic control model and the extent of processing metric.

Employing a dynamic control model to determine operating recipe parameters for completing the processing of wafers that had been interrupted during their initial processing runs, as described above, has numerous advantages. Because the process controller 90 determines the operating recipe parameters automatically, no time-consuming manual effort by fabrication personnel is required. Automatic process control also allows the completed wafer to have characteristics that are closer to target characteristic values, thus reducing variation in the completed devices. Increased efficiency and reduced variation generally amount to increased device performance and profitability of the manufacturing system 10.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for processing an interrupted workpiece, comprising:

providing a dynamic control model defining the processing characteristics of a processing tool throughout a processing run;

providing a partially processed workpiece that was interrupted during the processing run;

determining an extent of processing metric for the partially processed workpiece; and determining at least one operating recipe parameter of the processing tool based on the dynamic control model and the extent of processing metric.

2. The method of claim 1, further comprising processing the partially processed workpiece in the processing tool based on the determined operating recipe parameter.

3. The method of claim 1, wherein providing the dynamic control model further comprises providing the dynamic control model defining the processing rate of the processing tool throughout the processing run.

4. The method of claim 1, wherein determining the extent of processing metric further comprises determining the extent of processing metric based on an amount of time the partially processed wafer had been previously processed.

5. The method of claim 1, wherein determining the extent of processing metric further comprises determining the extent of processing metric based on an amount of time the partially processed wafer had been previously processed and the dynamic control model.

6. The method of claim 1, wherein determining the extent of processing metric further comprises:

measuring a characteristic of the workpiece; and determining the extent of processing metric based on the measured characteristic.

7. The method of claim 6, wherein the workpiece comprises a semiconductor wafer having a process layer formed thereon, and measuring the characteristic of the workpiece further comprises measuring a thickness of the process layer.

8. The method of claim 6, wherein the workpiece comprises a semiconductor wafer having a process layer formed thereon, and measuring the characteristic of the workpiece further comprises measuring a planarity of the process layer.

9. The method of claim 1, wherein determining the at least one operating recipe parameter of the processing tool further comprises determining a processing time parameter.

10. A method for processing an interrupted workpiece, comprising:

providing a dynamic control model defining the processing rate of a processing tool throughout a processing run;

providing a partially processed workpiece that was interrupted during the processing run;

determining an extent of processing metric for the partially processed workpiece; and determining a processing time parameter of an operating recipe of the processing tool based on the dynamic control model and the extent of processing metric.

11. The method of claim 10, further comprising processing the partially processed workpiece in the processing tool based on the determined processing time parameter.

12. The method of claim 10, wherein determining the extent of processing metric further comprises determining the extent of processing metric based on an amount of time the partially processed wafer had been previously processed.

13. The method of claim 10, wherein determining the extent of processing metric further comprises determining the extent of processing metric based on an amount of time the partially processed wafer had been previously processed and the dynamic control model.

14. The method of claim 10, wherein determining the extent of processing metric further comprises;

measuring a characteristic of the workpiece; and determining the extent of processing metric based on the measured characteristic.

15. The method of claim 14, wherein the workpiece comprises a semiconductor wafer having a process layer formed thereon, and measuring the characteristic of the workpiece further comprises measuring a thickness of the process layer.

16. The method of claim 14, wherein the workpiece comprises a semiconductor wafer having a process layer formed thereon, and measuring the characteristic of the workpiece further comprises measuring a planarity of the process layer.

17. A manufacturing system, comprising:

a processing tool adapted to process a partially processed workpiece in accordance with an operating recipe, wherein the partially processed workpiece was interrupted during a processing run; and a process controller adapted to determine an extent of processing metric for the partially processed workpiece and determine at least one parameter of the operating recipe based on a dynamic control model defining the processing characteristics of the processing tool throughout the processing run and the extent of processing metric.

18. The system of claim 17, wherein the dynamic control model defines the processing rate of the processing tool throughout the processing run.

19. The system of claim 17, wherein the process controller is further adapted to determine the extent of processing metric based on an amount of time the partially processed wafer had been previously processed.

20. The system of claim 17, wherein the process controller is further adapted to determine the extent of processing metric based on an amount of time the partially processed wafer had been previously processed and the dynamic control model.

21. The system of claim 17, wherein the process controller is further adapted to receive a measurement of a characteristic of the workpiece and determine the extent of processing metric based on the measured characteristic.

22. The system of claim 21, wherein the workpiece comprises a semiconductor wafer having a process layer formed thereon, and the measured characteristic comprises a thickness of the process layer.

23. The system of claim 21, wherein the workpiece comprises a semiconductor wafer having a process layer formed thereon, and the measured characteristic comprises a planarity of the process layer.

24. The system of claim 17, wherein the at least one operating recipe parameter comprises a processing time parameter.

25. A manufacturing system, comprising:

a processing tool adapted to process a partially processed workpiece in accordance with an operating recipe, wherein the partially processed workpiece was interrupted during a processing run; and a process controller adapted to determine an extent of processing metric for the partially processed workpiece and determine a processing time parameter of the operating recipe based on a dynamic control model defining the processing rate of the processing tool throughout the processing run and the extent of processing metric.

26. The system of claim 25, wherein the process controller is further adapted to determine the extent of processing metric based on an amount of time the partially processed wafer had been previously processed.

27. The system of claim 25, wherein the process controller is further adapted to determine the extent of processing metric based on an amount of time the partially processed wafer had been previously processed and the dynamic control model.

28. The system of claim 25, wherein the process controller is further adapted to receive a measurement of a characteristic of the workpiece and determine the extent of processing metric based on the measured characteristic.

29. The system of claim 28, wherein the workpiece comprises a semiconductor wafer having a process layer formed thereon, and the measured characteristic comprises a thickness of the process layer.

30. The system of claim 28, wherein the workpiece comprises a semiconductor wafer having a process layer formed thereon, and the measured characteristic comprises a planarity of the process layer.

31. A manufacturing system, comprising means for processing a partially processed workpiece in accordance with an operating recipe, wherein the partially processed workpiece was interrupted during a processing run;

means for determining an extent of processing metric for the partially processed workpiece; and means for determining at least one parameter of the operating recipe based on a dynamic control model defining the processing characteristics of the processing tool throughout the processing run and the extent of processing metric.

* * * * *